Aug. 3, 1943.　　　　G. L. KAYDEN　　　　2,325,684
COMBINED COFFEE ROASTER AND PERCOLATOR
Original Filed Feb. 1, 1939　　2 Sheets-Sheet 1
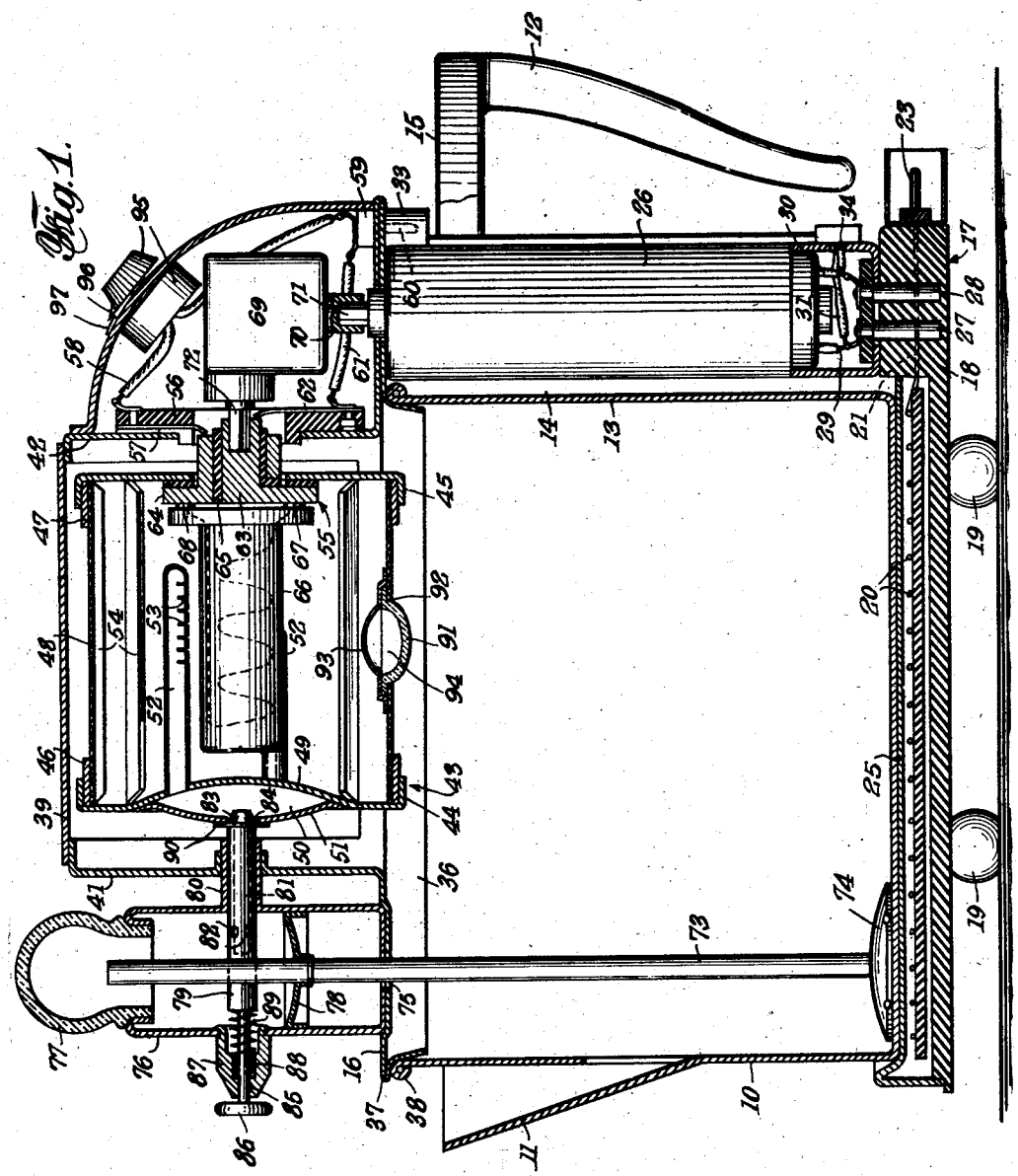
INVENTOR
Gustave L. Kayden
BY
ATTORNEY

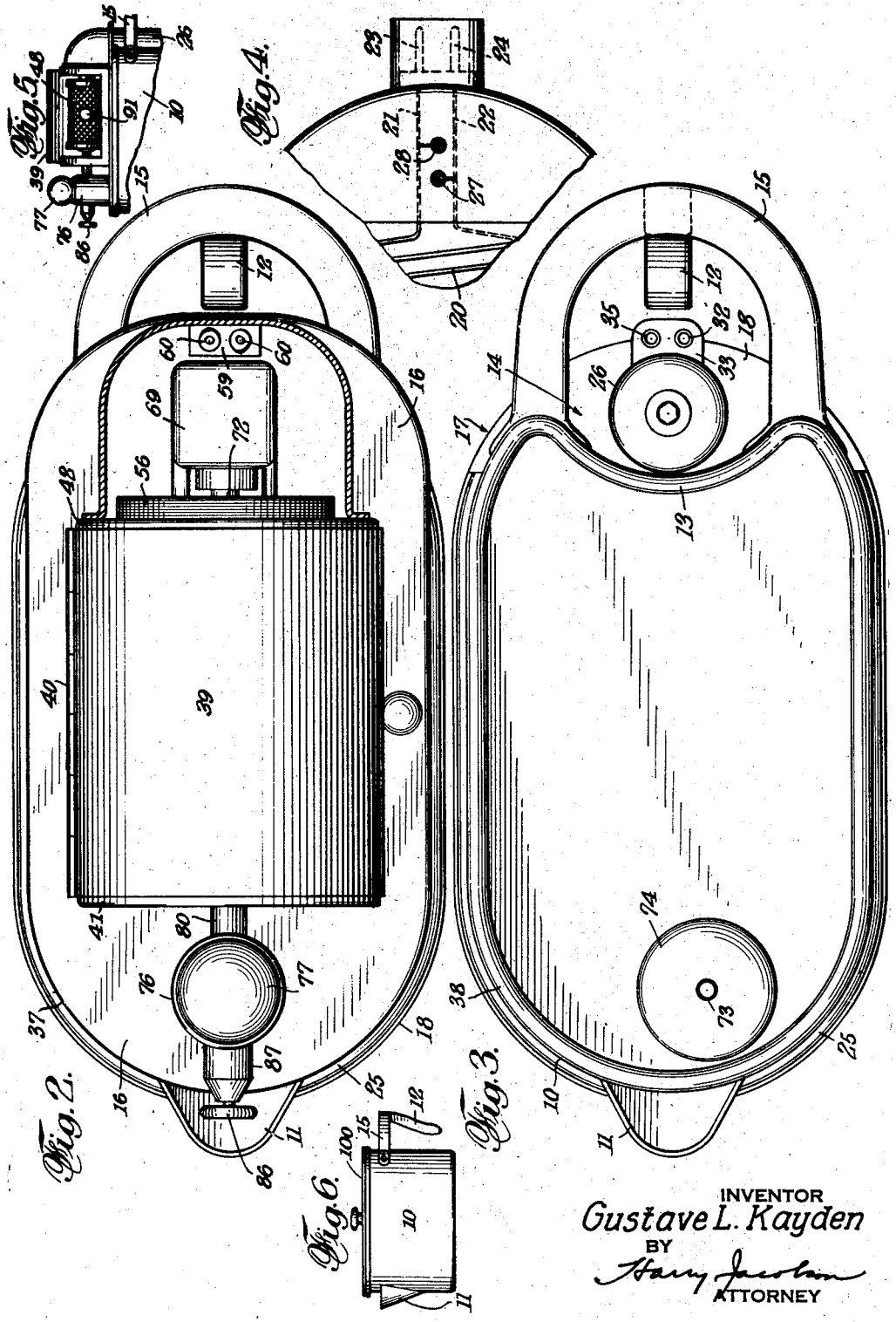

Patented Aug. 3, 1943

2,325,684

UNITED STATES PATENT OFFICE 2,325,684

COMBINED COFFEE ROASTER AND PERCOLATOR

Gustave L. Kayden, Woodmere, N. Y.

Substituted for abandoned application Serial No. 253,970, February 1, 1939. This application June 7, 1941, Serial No. 397,123

9 Claims. (Cl. 53—3)

This invention relates to apparatus for roasting coffee and for making or brewing liquid coffee therefrom immediately after the coffee has been roasted.

This is a substitute for my abandoned application serial No. 253,970 filed February 1, 1939.

Attempts have heretofore been made to devise apparatus to roast whole coffee beans, then to grind said beans, and thereafter to brew the coffee from the thus ground and roasted coffee. Such apparatus for roasting and grinding the raw coffee beans necessitates the transfer of the ground coffee to means wherein the coffee is percolated, and has consequently involved cumbersome, expensive and unwieldly mechanism.

My invention obviates these difficulties and results in a comparatively simple apparatus by the use of the simple expedient of supplying the raw coffee in a ground state instead of the whole bean to the apparatus, which roasts the thus ground raw coffee and immediately thereafter brews the coffee while the thus roasted coffee remains in the roaster and without the necessity for transferring the roasted coffee from one point to another.

My invention further contemplates the provision of means and a method for simultaneously agitating and roasting the raw ground coffee to the desired brownness and for brewing the coffee liquid from the freshly roasted coffee and without loss of any of the violate and fugitive essence and flavors of the coffee.

My invention further contemplates the provision of simple and efficient apparatus for roasting raw ground coffee without loss of the volatile ingredients thereof while bringing water to a boil so that the water boils at the same time that the roasting is finished, and immediately after the roasting operation has been completed, part of the boiling water is used to percolate the coffee automatically, the apparatus conducting the percolate back to the remainder of the boiling water to brew the coffee.

My invention further contemplates the provision of apparatus for brewing and roasting raw ground coffee, the apparatus being adapted to be so timed that the coffee percolating operation follows immediately after the completion of the roasting operation automatically and without any necessity of any action on the part of an operator, which apparatus may be readily operated by unskilled persons and results in a perfect coffee equal or superior in flavor to that brewed by expert coffee makers.

The various objects of the invention will be clear from the description which follows and from the drawings, in which, Fig. 1 is a vertical section of my invention.

Fig. 2 is a top plan view and partial section thereof.

Fig. 3 is a similar view of the same with the entire cover and roasting compartment removed and showing the coffee pot resting on its heater.

Fig. 4 is a fragmentary top plan view of a portion of the water heater.

Fig. 5 is a fragmentary elevation of the apparatus with the door of the roasting compartment open to expose the roaster to view.

Fig. 6 is a front elevation of the water container as it appears when removed from its heater stand and an ordinary cover substituted for the roaster compartment cover.

In the practical embodiment of the invention shown by way of example, the pot or water container 10 may be of any convenient type provided with the spout 11 and the handle 12. Preferably, one side of the pot is concaved as at 13 to provide the motor-receiving space 14 between said side and the top semi-circular portion 15 of the handle. The pot 10 is intended to be supplied with cold water in the desired amount. During the time required for boiling the water, for roasting the coffee, and for percolating water through the roasted coffee, the pot is covered by the combined roasting compartment and cover 16.

For boiling the water in the pot, I prefer to provide the heating unit 17, made generally in the form of a plate on which the pot 10 may be removably placed. Said unit includes the member 18 made of suitable heat and electric insulating material and supported by suitable cushioning legs or knobs 19. The heating element 20 is suitably supported above the insulating member 18 and receives current through the wires 21 and 22 (Fig. 4) which are connected to a corresponding pair of prong terminals 23, 24 adapted to removably receive a socket plug carrying current from a suitable electric circuit. The heating element heats a suitable heat-conducting member 25 preferably in the form of a plate which also serves to support the pot. Said member 25 may, therefore, be used independently of the pot as a cooking utensil for preparing other articles of food requiring heat. It will be understood, however, that any suitable means may be employed to heat the pot, though I prefer to use the heater 17 because the heat delivered thereby is substantially uniform and the boiling time of a given quantity of the water in the pot can therefore be determined within a close approximation.

The electric motor 26, preferably of the low-speed type, is suitably supported on the heater stand 17. Power is supplied to the motor by the wires 21, 22 which also supply current to the heater. As shown in Fig. 4, a suitable terminal 27 is connected to the wire 22 and a second terminal as 28 is connected to the wire 21. The short wires 29 and 30 lead from the respective terminals 27 and 28 to the terminals of the motor. An additional wire as 31 leads from the wire 29 to one terminal as 32 of the socket plug 33, a second wire as 34 leading from the wire 30 to the other terminal 35 of said socket plug, which is suitably supported by the heater stand adjacent the motor.

It will thus be seen that the pot 10 may be lifted off the heating stand 17 regardless of whether the roasting compartment 16 is on the pot or not. Preferably, the roasting compartment is removed from the pot when the coffee is finished and an ordinary pot cover as 100 (see Fig. 6) is substituted therefor so that the pot and its cover may be removed from the stand and the coffee poured therefrom without the necessity for handling the weight of the roasting compartment and its contents.

The combined roasting compartment and pot cover 16 includes the lowermost flange 36 adapted to enter inside of the pot and terminating in a lowermost flat edge. The compartment 16 and its contents may thereby be readily lifted off the pot and placed on a suitable supporting surface such as a table or the like when the roasting compartment is not in use, said flat edge supporting the compartment in its proper position without disturbing the interior roasting and agitating mechanism.

A horizontal flange as 37 on the roasting compartment engages the bead 38 at the top of the pot and maintains the compartment in its proper position relatively to the pot when the compartment is in use. The roasting compartment is open for part of its top and front, the opening being normally closed as by means of the cover 39 hinged as by means of the hinges 40 to the rear part of the compartment. Simple means such as a suitable hand-operated latch of the usual type (not shown) may be provided for holding the cover 39 in its proper closed position during the roasting operation, said cover, however, being readily opened to permit access to the roaster and to the interior of the roasting compartment and to permit inspection of the progress of the roasting operation when desired (see Fig. 5). The entire roasting compartment and cover 16 may readily be lifted off the pot by grasping the compartment at the door 39.

Upright side walls as 41 and 42 are provided on the roasting compartment, said walls serving to support the roaster 43 and its operating mechanism. Said roaster 43 is removably and rotatably mounted within the roaster compartment and may be of generally cylindrical shape. As shown in Fig. 1, the roaster comprises the end caps 44 and 45, which are frictionally mounted on the respective end portions 46, 47 of a suitable cylinder which is cut away at spaced areas of its mid-portion to expose the cylindrical wire mesh member 48 enclosed by said cylinder. The cap 44 is concaved at substantially its central part as 49 to provide the water inlet compartment 50 between said part 49 and the outer cap portion 51. Secured to the portion 49 and extending inwardly into the interior of the roaster are one or more tubes as 52 provided with slits as 53 and communicating with the water compartment 50. Secured to the cylindrical mesh member 48 at spaced intervals are a series of narrow radially arranged agitating vanes 54, said vanes serving to agitate the raw ground coffee by picking up and raising portions thereof above the heater as the roaster rotates, for the purpose of obtaining uniform roasting.

Supported by the end cap 45 is the commutator, designated generally by the numeral 55, said commutator comprising the stationary member 56 of insulating material suitably secured to the wall 42. On the inner face of said member is the terminal 57 which is connected to the wire 58 leading to a terminal of the pronged plug 59 carried by the base of the roaster compartment. Said plug is provided with suitable prongs 60 designed to enter the socket plug 33 and to form an electric connection therebetween when the roaster compartment is set on the pot into its operative position. From the other terminal of the plug 59 extends the lead 61 which is connected to the second terminal 62 on the outer face of the commutator member 56. Said terminal 62 engages the rotatable inner member 63 of the commutator while the terminal 57 engages the outer rotatable member 64, said members 63 and 64 being separated by the insulating ring 65. The member 64 also carries the electric heater 66 of any suitable type, but here shown as cylindrical in form and covered with a heat-conducting material not affected by water and not likely to become distorted or to crack. The terminals 67 and 68 of the heater are respectively connected to the inner and outer commutator members 63 and 64 so that the resistance element of said heater receives current continuously during the rotation of the roaster and the consequent rotation of the heater. The end cap 45 of the roaster is secured to the commutator member 64, a suitable insulating member being interposed therebetween.

In order to rotate the commutator and therethrough to rotate the heater and the roaster, suitable reduction gearing enclosed in a gear box 69 is provided. Said gearing may be of any suitable type designed to rotate the roaster slowly in comparison to the speed of rotation of the motor 26. The driven shaft 70 of the reduction gearing is provided with a hollow hexagonal inner wall which receives the hexagonal shaft 71 of the motor 26. The exposed end of the driving shaft 72 of the reduction gear unit is also made hexagonal and fits into a correspondingly shaped hole in the commutator member 63. It will thus be seen that when the roaster compartment is set in place on the pot 10, the hexagonal shaft 71 engages the hexagonal hollow wall of the driven shaft 70, while at the same time a suitable electric connection is made between the plugs 59 and 33 so that when current is supplied to the terminals 23, 24, the motor is rotated and through the reduction gear unit 69, rotates the roaster 43. The element 20 of the heater stand is also energized when the terminals 23 and 24 are energized, thereby heating the water in the pot and ultimately causing the water to boil. Means later to be described are provided for timing the roasting and water-boiling operations so that both are completed at the same time.

Suitable means are also provided for percolating the raw ground coffee inserted into the roaster. Said means consists of the percolator pile 73 terminating in the usual base 74 which is provided with openings or notches whereby water may enter the pipe. Said pipe extends through the opening 75 of the roaster cover 16 and into the preferably cylindrical percolator member 76 which terminates in the glass cap 77 through which the percolating operation may be inspected. A shelf as 78 between the ends of the percolator member 76 surrounds the percolator pipe and largely prevents water discharged from the pipe 75 from going back into the pot.

Means are also provided for conducting the boiling water from the percolator member into the interior of the roaster. Said means comprises the rod 79 mounted for longitudinal sliding movement in the tube 80 projecting from the percolator member 76 and through the wall 41 of the roasting compartment. Said rod is provided with a longitudinal opening 81 therein, communicating with the interior of the percolator member 76 through the radial holes 82 of the rod. The rod 79 terminates in a reduced preferably conical portion 83 entering the opening 84 in the outer member 51 of the roaster cap 44 and thereby revolubly supporting the left end of the roaster, as viewed in Fig. 1. From the left end of the rod 79 projects the reduced rod portion 85 terminating in the knob 86. Said portion 85 is slidably mounted in the bushing 87 projecting from the percolator member 76. A suitable washer as 88 prevents leakage of water out of the percolator member and around the rod portion 85. Interposed between the bushing 87 and the left end of the rod 79 is the spring 89 which serves to urge said rod toward the right into its proper operative engagement with the roaster. A second washer as 90 is preferably interposed between the unreduced end of the rod 79 and the wall 51 for preventing leakage of water out of the water compartment 50.

In order that the roasting operation may be readily visible as it progresses, and so as to determine the degree to which the raw ground coffee is being roasted, a transparent member 91 is secured in the opening 92 of the mesh member 48 of the roaster as by means of the holder 93 therefor. Said holder is made in the form of a scoop, so that during the rotation thereof, some of the browned or roasted ground coffee enters between said member 93 and the transparent member 91 and is carried upwardly to the top of the roaster compartment during the rotation of the roaster and then dropped to mingle with the remaining coffee. When the door 39 is opened (Fig. 5), the ground coffee taken up by the scoop may be inspected to determine whether or not the roasting operation has been completed and how it is progressing.

The amount of current supplied to the heater 66 may be controlled by any suitable means so as to determine the relative time of the roasting operation and the boiling of the water in the pot. It is of course desirable that the roasting operation be completed just as the water in the pot begins to boil. For this purpose a rheostat as 95 is interposed in the line 58. Said rheostat is provided with an indicator 96 designed to be turned to indicate numerals on a suitable indicia plate 97 on the stationary part of the rheostat. Turning of the pointer serves to reduce or increase the current supplied to the heater 66. The selected point of the indicator plate depends on the strength of coffee to be made, the degree of roasting required and the quantity of water in the pot. It will be obvious that by increasing or decreasing the roasting time as by suitable manipulation of the rheostat, said time may be made to correspond precisely to the time necessary for boiling the water so that both operations may be completed simultaneously or nearly so. The operator will soon become familiar with the proper setting of the rheostat for the quantity and strength of coffee desired.

In operation, the cover 39 being closed, the entire roaster compartment is removed from the pot or water container and the required quantity of water inserted thereinto. The roasting compartment when so removed may be set on a table for easy access to the interior thereof. The door 39 is then opened and the knob 86 pulled toward the left, thereby releasing the roaster 43. Said roaster is then easily removed from the roasting compartment and the cap 44 thereof removed. The desired quantity of raw ground coffee is now inserted into the roaster and the cap 44 replaced whereafter the entire roaster is reinserted into the compartment by reinserting the member 72 in the opening in the commutator member 63 and then inserting the reduced ends 83 into the opening 84 of the roaster. The cover 39 is now closed and the entire roasting compartment set on the top of the pot to act as a cover therefor. Such setting of the roaster compartment in place connects the plugs 59 and 33 and completes the connections to the commutator and to the heater. When current is now supplied to the terminals 23, 24 by a suitable plug, the motor 26 begins its rotation and current is also supplied to the heater 66 and to the heating element 20. Said heating element begins to heat the water in the pot while the heater 66 begins to heat the coffee in the roaster while at the same time the motor 26 through the reduction gearing 69, rotates the roaster comparatively slowly. The vanes 54 at this time pick up small quantities of coffee and agitate the coffee, preventing it from remaining at the bottom of the roaster, some of the coffee entering and leaving the scoop compartment 94 at each complete rotation of the roaster.

When the water in the pot begins to boil, the boiling water enters the percolator member 76 and also passes through the openings 82 into the opening 81 and therethrough enters the roaster and percolates the coffee, which has in the meantime been roasted to the desired color. Said color may be inspected during the roasting operation by opening the door 39 and viewing the coffee in the compartment 94. If the coffee is not brown enough, the rheostat 95 is operated to increase the current to the heater 66. If the coffee is too dark before the water begins to boil, the rheostat 95 is operated to decrease or cut off the heat to said heater. After the coffee has been percolated, the percolate passes through the mesh member 48 and mixes with the water of the pot to complete the brewing of the coffee. During the percolating operation, the color of the liquid coffee may be readily inspected through the transparent member 77.

When the coffee has been completely brewed, the roasting compartment 16 is removed from the pot and an ordinary cover as 100 (Fig. 6) substituted therefor. The plug may remain connected to the terminals 23, 24 if desired to keep the coffee hot until consumed or said plug may be removed. The pot may be readily lifted off the heating stand 17 and away from the motor 26 and the coffee poured. The roaster 43 may be readily cleaned and the coffee grounds removed therefrom on the removal of the cap 44 while the pot 10 is being used or at any time after the coffee is brewed.

It will be understood that, if desired, separate switches (not shown) may be interposed in any of the electric lines to the heaters and motor so that operation of each may be individually controlled. Such switches being well known, no illustration thereof is deemed necessary. It will also be understood that heat may be supplied to the pot and to the roaster in various ways which will now be obvious, that the roaster and the agitator means therefor may assume various forms and that many changes from the structure herein illustrated may be made without departing from the spirit of my invention.

While, therefore, I have shown and described a specific illustrative embodiment of my invention, I do not wish to be understood as limiting myself thereto, but desire to claim my invention as broadly as may be permitted by the state of the prior art and the scope of the appended claims.

I claim:

1. In apparatus of the character described, container means for agitating and roasting raw ground coffee including heating means, a water container below the container means, means for heating the water container, means for adjusting one of said heating means relatively to the other heating means so that the water in the container begins to boil at the same time that the roasting of the coffee in the container means is completed, and means communicating with the container means and the water container for percolating the roasted coffee in the container means.

2. In coffee roasting and making apparatus, a water container, a removable combined roasting compartment and cover for the container, a roaster in the compartment, said roaster being adapted to receive raw ground coffee and having openings therein of insufficient size to permit the passage of the raw ground coffee therethrough, an electric heater for the roaster, a commutator for the heater, revoluble coffee agitating means in the roaster, means for rotating the agitating means and the heater, and percolator means communicating with the container and the roaster to conduct boiling water from the container to the roaster.

3. In coffee roasting and making apparatus, a water container, means for heating said container including a plate removably supporting the container, a motor carried by the heating means, a combined roasting compartment and cover for the container, a revoluble coffee roaster in the compartment adapted to receive raw ground coffee, means detachably connecting the roaster to the motor for rotating the roaster, an electric heater for the roaster, and percolator means communicating with the container and the roaster to conduct boiling water from the container to the roaster and thereby to percolate the coffee in the roaster after said coffee has been roasted by the electric heater.

4. In coffee roasting and making apparatus, a water container, a combined roasting compartment and cover for the container, a roaster in the compartment, an electric heater for the roaster, percolator means communicating with the container and the roaster to conduct boiling water from the container to the roaster, heating means for the container, and means to adjust the relative heating effect of the container-heating means and the roaster-heating means to bring the water in the container to a boil at the same time that the roasting of the coffee in the roaster is completed.

5. In coffee roasting and making apparatus, a container for ground raw coffee comprising a cylindrical metallic screen, and a pair of end closure caps for said screen, heating means within the roaster, means for rotating the roaster and the said heating means, means for removably supporting the roaster, and percolator means passing through the supporting means for conducting boiling water to the interior of the screen.

6. In coffee roasting and making apparatus, a water container, a cover for said container comprising a roaster compartment, a revoluble perforate roaster removably carried by said cover in said compartment, a door on the cover adjacent the roaster, said door being adapted to be opened to provide access to the roaster, a heater for said roaster, a transparent coffee-scoop member carried by the roaster, and a percolator conduit between the water container and the roster communicating with the interior of the roaster.

7. In coffee roasting and making apparatus, a water container, a horizontal combined supporting member and heater for the container, a motor carried by the supporting member, a cover for the container, said cover having a transparent member therein, a door forming part of the cover, a cylindrical mesh container for raw ground coffee removably carried by the cover adjacent the door, an electric heater within the coffee container, a commutator for the heater, means operatively connecting the motor to the commutator, heater, and coffee container for rotating the same on operation of the motor, said last-mentioned means being disconnectible from the motor on the lifting of the cover from the water container, a percolator pipe extending between the water container and the transparent member of the cover, and a conduit from said transparent member to the interior of the coffee container for conducting boiling water, passing upwardly through said pipe, into the coffee container and thereby percolating the coffee in said coffee container.

8. A normally upright combined coffee roasting and brewing apparatus comprising a water container in the lower portion thereof adapted to be heated to boil the water therein, a receptacle for green ground coffee within said apparatus located above said water container and out of contact with the water in said container, means for supplying heat to the green ground coffee over an extended area thereof, and means for passing water after it has been heated to coffee extraction temperature from said container through said coffee receptacle to effect a coffee beverage, a cover for said apparatus, means associated with said cover for controlling said heat supplying means.

9. A normally upright combined domestic coffee roasting and brewing apparatus, comprising a water container having a pouring spout open to atmosphere and adapted to be heated to boil the water therein, a receptacle for green ground coffee associated therewith and out of contact with said water, said container and said receptacle being in relatively fixed position with respect to each other and with respect to said apparatus as a whole, means for supplying heat to the green ground coffee over an extended area thereof, and means for passing water after it has been heated to a coffee extraction temperature from said container and through said coffee receptacle to effect a coffee beverage, a cover for said apparatus, means associated with said cover for controlling said heat supplying means, said control means being actuable to effect cessation of heat supply when said cover is open and effecting supply of heat when said cover is closed.

GUSTAVE L. KAYDEN.